0 SECONDS   1.0 CU. FT. VOLUME

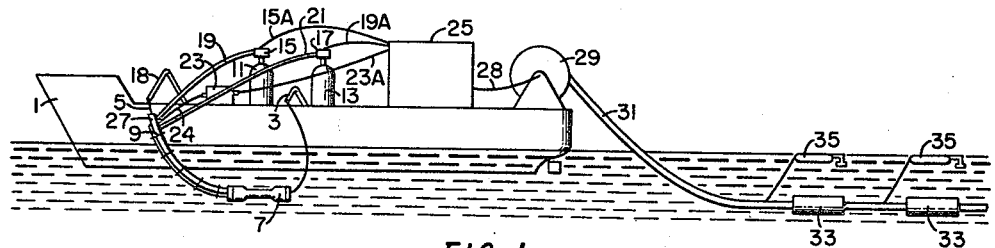

.053 SECONDS   4.16 CU. FT. VOLUME

Nov. 25, 1969                A. BARRY ET AL                3,480,101
                SEISMIC WAVE SOURCE USING EXPLOSIVE GAS
                      IN AN EXPANSIBLE ENCLOSURE
Filed June 5, 1967                                    5 Sheets-Sheet 3

SECTION A-A

SECTION B-B
(BEFORE FIRING)

ADELBERT BARRY     INVENTORS
FRANKLIN L. CHALMERS
JOHN B. PEARSON

BY *John B Davidson*

ATTORNEY

Nov. 25, 1969

A. BARRY ET AL 3,480,101

SEISMIC WAVE SOURCE USING EXPLOSIVE GAS IN AN EXPANSIBLE ENCLOSURE

Filed June 5, 1967

SECTION A-A

ADELBERT BARRY
FRANKLIN L. CHALMERS  INVENTORS
JOHN B. PEARSON

BY *John B. Davidson*

ATTORNEY

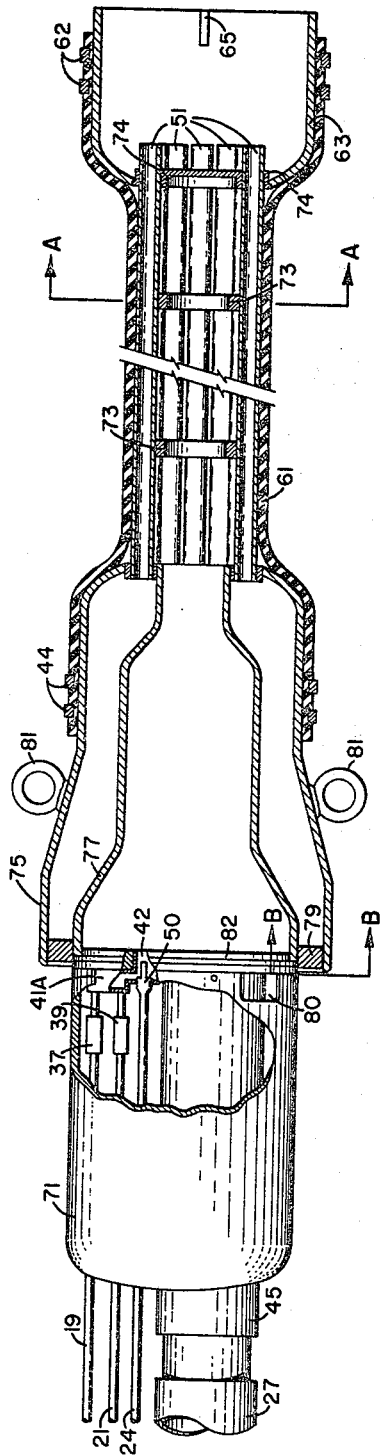
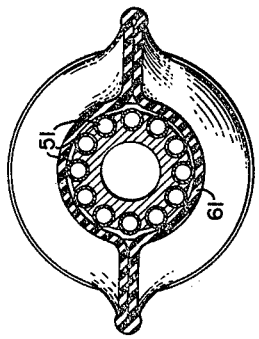
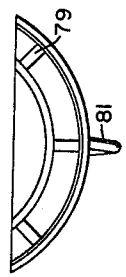
ADELBERT BARRY
FRANKLIN L. CHALMERS   INVENTORS
JOHN B. PEARSON
BY John B Davidson
ATTORNEY

United States Patent Office 3,480,101
Patented Nov. 25, 1969

3,480,101
SEISMIC WAVE SOURCE USING EXPLOSIVE GAS IN AN EXPANSIBLE ENCLOSURE
Adelbert Barry, Franklin L. Chalmers, and John B. Pearson, Houston, Tex., assignors to Esso Production Research Company, a corporation of Delaware
Continuation-in-part of application Ser. No. 614,307, Feb. 6, 1967. This application June 5, 1967, Ser. No. 653,284
Int. Cl. G10k *11/00;* G01v *1/00, 1/10*
U.S. Cl. 181—.5
40 Claims

ABSTRACT OF THE DISCLOSURE

A marine seismic wave source includes an enclosure for combustible gas including a plurality of elongated tubular members a flexible, expansible elastomer around the tubular members, means for introducing a combustible gaseous mixture into the enclosure and for igniting the mixture. When the device is towed through the water after production of a seismic pulse after igniting the gaseous mixture, the gaseous combustion products and the components of the enclosure are rapidly cooled by water passing through the tubular members. The source may further include an exhaust conduit extending from the enclosure to the water surface and a check valve therein for permitting gaseous flow only from the enclosure to the earth's surface. Preferably, the movable member of the check valve has high inertia and comprises a spring-biased movable valve member seating on a valve seat.

CROSS-REFERENCE TO RELATED APPLICATION

This application is a Continuation-in-Part of application Serial No. 614,307 filed February 6, 1967, and now abandoned for "Seismic Wave Source for Use at Marine Locations" in the names of Adelbert Barry, Franklin L. Chalmers and John B. Pearson.

BACKGROUND OF THE INVENTION

This invention is directed to seismic sources for use at marine locations, and more particularly to seismic sources using an explosive gaseous mixture in an enclosure including a flexible, expansible elastomer.

In the course of seismic prospecting at marine locations it has been customary in the past to use dynamite as a source of seismic waves. While it is possible to successfully conduct seismic exploration using dynamite as the seismic wave source, dynamite suffers from a number of severe shortcomings peculiar to its use at marine locations. Seismic waves produced by dynamite are of a broad spectrum of frequencies concentrated at the high end of what is generally considered to be the useful seismic range. This is particularly true at marine locations inasmuch as the cavitation and bubbling produced by exploding dynamite in the water results in the production of high frequency waves. Furthermore, since the seismic waves produced by bubbling and cavitation are not relatable to the time break or instant of detonation of the dynamite, they tend to obscure the useful seismic information on resulting seismograms and make the interpretation of the seismograms exceedingly difficult. This is compounded by the fact that the cavitation and bubbling continues for a substantial period of time after the detonation of the dynamite, particularly when the dynamite is detonated at considerable depths in the water.

In the past there have been efforts to develop seismic wave generators which are not dependent upon dynamite as an energy source. The most promising of these various sources uses explosive gas mixtures as the source of energy. The gas is usually enclosed in an open-bottomed dome or within an enclosure including an elastomer, and is detonated therewithin. Combustion products are vented to the earth's surface to eliminate bubbling or are allowed to escape into the water. The sources are very difficult to handle, particularly in rough water, inasmuch as they are generally over 100 feet in length or are very large and heavy. Further, those sources that exhaust into the water have the bubble pulse problem. The spectrum of seismic waves produced thereby often are largely outside of the band generally considered most useful for seismic exploration operations. As a result, the seismic waves produced by such sources may not penetrate the earth to a particularly great depth. When it is desired to obtain seismic information from depths requiring greater penetration, seismic operators usually must rely on dynamite as the source of seismic waves.

Accordingly, one object of the present invention is to provide an easily handled source of seismic waves using a flexible elastomer means and an explosive gaseous mixture as the source of energy that is capable of penetrating the earth to great depths. Additional objects are to provide for ease of handling in rough seas and minimization of servicing requirements.

SUMMARY OF THE INVENTION

In accordance with one aspect of the invention, a seismic wave source for use at marine locations is provided by means of a conduit and combustion chamber assembly, the conduit being thermally conductive and arranged to provide a flow path for water therethrough during movement of the assembly through a body of water. Connected to the conduit and combustion chamber assembly is an elastic inflatable member covering at least a portion of the surface of the assembly and secured thereto. Connected to the assembly is means for introducing an explosive gaseous mixture into the housing and elastomer means, and means for igniting the explosive gaseous mixture. It has been found that when the source described above is towed through the water, the heat produced by the combustion gases cools sufficiently rapidly that no great amount of heat is transmitted to the elastomer means. As a result, the elastomer means can be expanded without deleteriously affecting its life. Preferably, there is connected to the housing an exhaust line for passing gases to the earth's surface and a check valve in the exhaust line for permitting flow of gases only from the housing through the exhaust line. Preferably also, this check valve includes a high inertia, spring-biased closure member for seating on a valve seat such that the pressure pulse is produced before the spring-biased closure member can vent gases from the enclosure. When gases are vented from the enclosure including the housing and the elastomer means, immediately after the production of seismic waves, a partial vacuum is produced in the housing by the rapid cooling of gases remaining therein.

BRIEF DESCRIPTION OF THE DRAWINGS

Objects and features of the invention not apparent from the above discussion will become evident upon consideration of the following detailed description of the invention taken in connection with the accompanying drawings, wherein:

FIG. 1 illustrates apparatus for seismic surveying at marine locations in accordance with the present invention;

FIG. 2 illustrates one embodiment of the present invention;

FIGS. 3 and 4 are sectional views taken along sections A—A and B—B, respectively, of FIG. 2;

FIG. 5 is an end view from the right of the apparatus of FIG. 2;

FIG. 6 is a sectional view taken along section B—B shortly after detonation of explosive mixtures within the apparatus of FIG. 2;

FIG. 15 is a view partially in elevation and partially in cross section illustrating a preferred embodiment of the invention;

FIG. 16 is a cross-sectional view taken along section A—A of FIG. 15; and

FIG. 17 is a view taken along section B—B of FIG. 15.

DESCRIPTION OF THE PREFERRED EMBODIMENTS

Figure 7A:
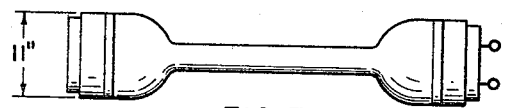
FIGS. 7A through 7E illustrate the outline of the seismic source of FIG. 2 at various instants after detonation.

With reference to FIG. 1, there is illustrated a marine vessel 1 for carrying personnel and equipment for seismic exploration. A seismic source 7 is connected to a boom 18 on the deck of the vessel 1 by means of line 5. Storage enclosures for oxygen and an explosive gas, such as propane or acetylene, are designated by reference numerals 11 and 13 and are carried aboard the ship. Enclosures 11 and 13 are connected to the seismic source 7 through proportioning solenoid valves 15 and 17, respectively, and through gas conduits or lines 19 and 21, respectively. A conventional firing box 23 is connected to the sound source through electrical leads 24 for the purpose of electrically energizing a spark plug for igniting explosive gas within the seismic source 7. The solenoid valves 15 and 17 and the firing box 23 are connected to a seismic recorder 25 through lines 15A, 19A, and 23A. They are actuated by an electrical source and cam-actuated switches in the recorder 25 for opening the solenoid valves and energizing the firing box at appropriate times in the recording interval. Solenoid valves 15 and 17 will be actuated at the end of a recording interval whereas firing box 23 will be actuated at the beginning of the recording interval. Line 5, gas conduits 19 and 21, exhaust conduit 27 and electrical leads 24 are cabled together, and source 7 is towed from the resulting cable assembly which is held away from the side of the ship by a boom 18. A line connected to boom 3 serves to properly position the source relative to the vessel. A weighted geophone cable 31 comprising a plurality of active cable section 33 (i.e., cable sections containing geophones) is connected to a conventional cable reel 29 so as to be windable thereon. A plurality of cable floats 35 are connected to the cable so as to suspend the active sections of the cable at an appropriate depth in the water. Electrical connection from the recorder 25 to the active cable sections 33 is through electrical leads 28 between the recorder and the reel and electrical leads running the length of the cable in the usual manner.

With reference now to FIGS. 2, 3 and 4, there is illustrated a sound source comprising a pair of rigid end housing members 43 and 59 having a pair of elongated tubular pipes 51 interconnecting housing members 43, 59 and extending completely therethrough. A sleeve 61 of flexible, expansible elastomer such as rubber or neoprene is sealingly connected at the ends thereof to the housing members 43 and 59 by means of annular clamps 44, 62. Between the housings 43 and 59 there is affixed a pair of metal plates 53, 57 above and below the pipes 51. The plates 53, 57 have a plurality of openings or perforations therein to permit gas to pass therethrough and under the elastomer means. An opening 66 in the housing 43 and an opening 67 in the housing 59 provide fluid communication between the chamber defined by the housing 43, the space between the plates 53, 57 and the housing 59. The end plate of the housing 43 has a pair of openings 42 and 52 therein for respectively providing ports for injecting gas into the chamber defined by the housing 43 and for exhausting gas therefrom.

Conduits 19 and 21 are connected to a mixing chamber 41 by means of a pair of check valves 37, 39, respectively, that permit flow of gases only from the conduits 19, 21 into the mixing chamber. The mixing chamber 41 is connected to the port 42 so that an explosive gaseous mixture can be introduced into the chamber defined by the housing 43. Exhaust conduit 27 is connected to the housing 43 through a check valve including a housing member 45, a valve seat 48, and a movable valve member 49 seating on the valve seat and urged thereagainst by means of a coil spring 47. The movable valve member 49 has high inertia and preferably weighs at least 5 pounds.

A pair of eyes 65 are connected to the end plate 63 of housing 59 so that the line extending from boom 3 may be connected to the sound source 7.

The coil spring 47 is positioned between a nut 46 and the movable valve member 49. The pressure within the chamber of housing 43 that is required to unseat the valve member 49 may be adjusted by means of threaded nut 46. A portion of the housing 45 is internally threaded to receive nut 46.

Figure 7B:
Figure 7C:
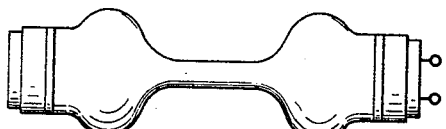
Figure 7D:
Figure 7E:
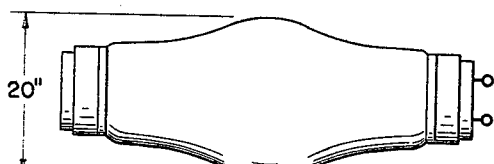
Figure 8:
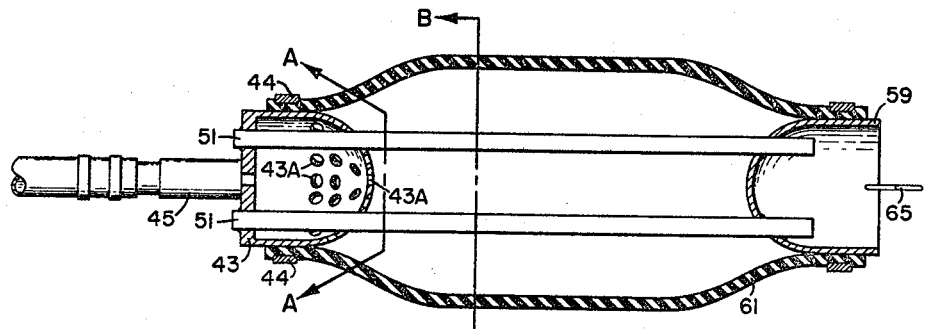
FIG. 8 is a cross-sectional view illustrating another embodiment of the invention.
Figure 9:
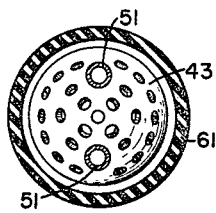
FIGS. 9 and 10, respectively, are cross-sectional views taken along section A—A and B—B, respectively, of FIG. 8.
Figure 10:
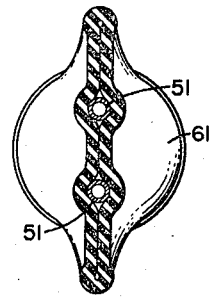
Figure 11:
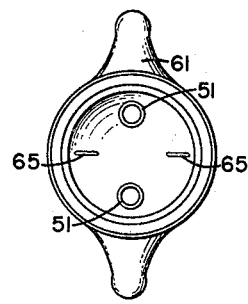
FIG. 11 is an end view from the right, as illustrated, of the apparatus of FIG. 8.

To carry out one cycle of operation, proportioning solenoid valves 15 and 17 are opened at the end of a given recording interval until the explosive gas and oxygen mixture injected into the chamber of housing 43 is approximately sufficient to unseat the valve member 49. At this point the recorder is started, and at the beginning of the next recording interval of the recorder, the firing plug 50 is activated by electrically energizing line 24 from the electrical source in the recorder in the usual manner. For a reason that is not completely understood, the detonation of the explosive mixture will cause the elastomer 61 to assume the successive shapes illustrated in FIGS. 7A through 7E. It appears that the gas is ignited axially down the sleeve because the sleeve initially begins to bulge at the ends thereof around the housing members 43 and 59, as illustrated in FIG. 7B. The central portion of the sleeve then begins to expand outwardly, as illustrated in FIGS. 7C and 7D. Finally, the central portion of the sleeve extends completely outwardly and expands to its maximum extent as illustrated in FIG. 7E and also in FIG. 6. Using a source that takes one cubic foot of the explosive gaseous mixture at a pressure of 13 p.s.i., it has been found that the sleeve expands to its maximum extent at 0.053 second after detonation of a propane-oxygen mixture by means of the firing plug 50. The expansion is from a volume of one cubic foot to a volume of 4.16 cubic feet during this interval.

In FIGS. 8, 9, 10 and 11 there is illustrated another embodiment of the invention wherein the plates 53 and 57 are eliminated. The housing sections 43 and 59 are interconnected by pipes 51 only. The end plate 63 of the embodiment of FIG. 2 is eliminated and the towing eyes 65 are welded or otherwise affixed directly to the interior of the bell-shaped housing section 59. The elastomer 61 in its normal shape has the cross section shown in FIG. 10. The interior of opposite sides of the elastomer may touch each other between the pipes 51. The housing section 43 has a plurality of openings or perforations 43A in one end thereof to permit explosive gas to flow from the chamber within the housing section 43 to within the expansible flexible elastomer 61. The pressure required to unseat the exhaust valve 49 is adjusted by means of nut 46. Thus, there is a control of the maximum quantity of gas that can be injected into the apparatus.

Figure 12:
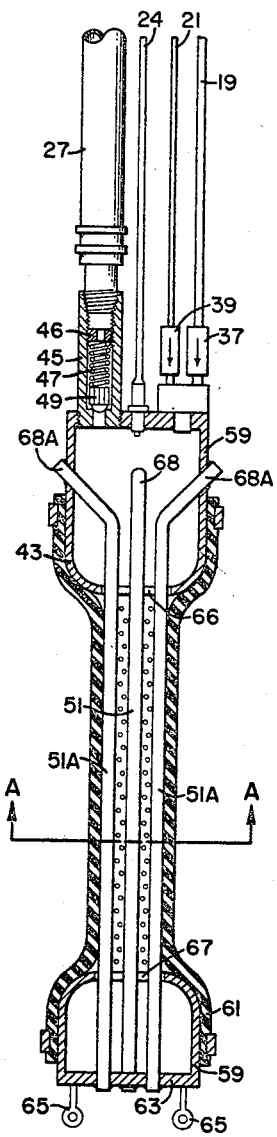
FIG. 12 is a cross-sectional view illustrating still another embodiment of the invention.
Figure 13:
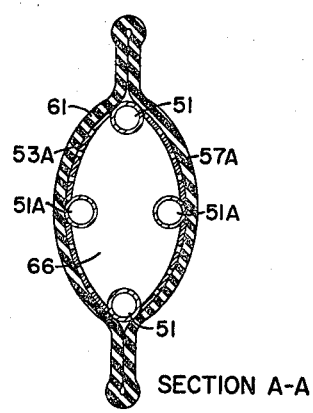
FIG. 13 is a cross-sectional view taken along section A—A of FIG. 12.
Figure 14:
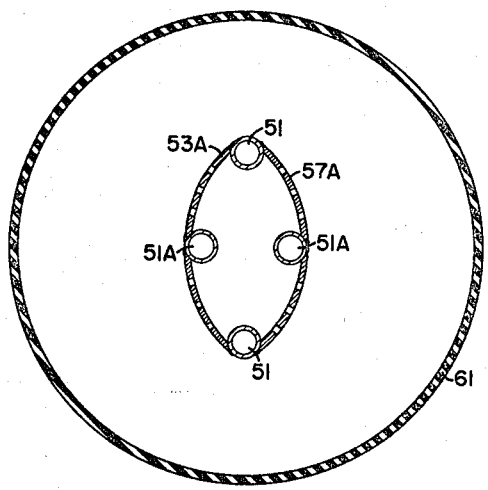
FIG. 14 is a cross-sectional view taken along section A—A of FIG. 12 shortly after detonation of explosive gas in the apparatus of FIG. 12.

A third embodiment of the invention is illustrated in FIGS. 12, 13 and 14. The flat plates 53, 57 illustrated in FIG. 2 are replaced by arcuate plates 53A, 57A such that the cross section formed by tubes 51 and plates 53A, 57A is substantially that of an oval. The plates 53A, 57A are affixed at the ends thereof to housing sections 43, 59 and along the longitudinal edges thereof to the pipes 51. An additional pair of pipes 51A may be positioned within the arcuate sections midway between the pipes 51 to provide additional cooling. The pipes should be bent at the leading end thereof at sections 68 and 68A to extend through the side of the chamber 59. Otherwise, the construction is substantially as in the embodiment of FIG. 2. When the apparatus is detonated, the cross section assumed by the elastomer sleeve and the other portions of the apparatus will be substantially as illustrated in FIG. 14 when the elastomer sleeve is at its greatest volume.

As has been mentioned above, the nut 46 controls the force exerted by the spring 47 upon the valve member 49. Obviously, the maximum pressure exerted by the incoming gases in the combustion chamber cannot exceed this force without wasting gas. It will also be apparent that, in operation, the detonation may be caused to take place whenever the pressure exerted by the incoming gases is something less than the pressure required to open valve 49. As also mentioned previously, the valve member 49 should have high inertia so that it will not unseat immediately upon detonation at ignition of the spark plug 50. This permits a relatively large pressure pulse to be produced inasmuch as the elastomer sleeve can expand to a desired extent. After the movable valve member 49 is unseated, gases will rush out of the enclosure formed by the housing member 43 and the elastomer sleeve through the exhaust conduit 27. The cooling of the gases provided by water flowing through the tubes 51 (and 51A of FIG. 9) will then produce a partial vacuum within the chamber so that the elastomer sleeve is drawn snugly against the housing and the cooling pipes. The vacuum thus produced has the additional advantage of promoting mixing of the gas and oxygen when the gases are injected into the chamber defined by the housing 43, the space between arcuate plates 53A and 57A, and the housing 59.

In FIGS. 15, 16 and 17 there is illustrated a preferred embodiment of the invention. Like items in these figures and in the preceding figures are designated by the same reference numerals. Tubes 51 are illustrated as being twelve in number and as being arranged in a circular pattern. As few as six tubes may be used. Tubes 51 are held in parallel, spaced apart relationship by annular spiders 73 which are brazed or welded thereto. Spiders have a central opening therein, as is most perspicuously seen in FIG. 16. The tubular members 51 are also held in spaced relationship by a closed end member 74 which also serves to confine the gases within the combustion chamber. In other words, member 74 prevents gases from escaping out the end of the assembly. Member 74 is affixed to end bell 63. At the front end of the assembly the pipes 51 are affixed to a pair of bell-shaped members 75, 77, the tubes being affixed to the small-diameter end of both members. The members 75, 77 are held in substantially coaxial spaced apart relationship by means of a plurality of spacer members 79 at one end thereof and by the tubes 51 at the other end thereof. The combination of the member 75, 77 and the tubes 51 forms a conduit for the flow of water, the water entering the structure through the space between member 75, 77 and the spacer members 79 and leaving the structure through the conduits 51 and the end bell 63. Lifting eyes 81 and lifting lugs 65 are more or less annular in shape and are respectively affixed to bell member 75 and to end bell 63. Eyes 81 and lugs 65 provide attachment means for the line connected to boom 3. Gas lines 19, 21 are connected to mixing chamber 41A through check valves 37, 39, as described above. Mixing chamber 41A is slightly different fro mmixing chamber 41 described previously in that there is provided means for affixing spark plug 50 thereto so that the gases mixed therein after passing through check valves 37 and 39 must pass directly past the electrodes of the firing plug 50 before passing into the rest of the combustion chamber. The positioning of the firing plug 50 in mixing chamber 41A so that the recently mixed gases must pass thereby insures the ignition of the combustible mixture. It appears that enough of the gas remains in the mixing chamber to insure ignition whereas when the port 42 is spaced from the ignition plug 50 a misfire may occur from time to time. The exhaust conduit 27, the check valve housing member 45 and the components included therewithin are as described previously with regard to FIGS. 2, 8 and 12. A fairing 71 is placed around a portion of the check valve 45, the mixing chamber 41A, check valves 37 and 39, and the spark plug 50 to protect these items against damage. Preferably the diameter of the fairing is no greater than the diameter of the inner bell member 77 to insure passage of water into the space between members 75, 77. A plurality of openings 80 are provided in the end of the fairing 71 abutting against closure plate 82 so that water will flow through the space between the check valve housing 45 and the fairing 71 and out through the openings 80 to cool the mixing chamber 41A and the other components within the fairing.

The operation of the apparatus illustrated in FIGS. 15, 16 and 17 is substantially the same as the operation of the apparatus described previously. The advantage of this embodiment is that all items are cooled by the water that passes through the unit when it is towed by a marine vessel. The water passing through the fairing 71 cools the portion of the combustion chamber including the mixing chamber 41A to prevent preignition of the combustible gas. Every metal member touched by elastomer 61 is cooled by water continually passing on the opposite side of the metal member from the elastomer. Heat is thus continuously dissipated by the passage of the water to minimize the temperature rise of the metal members. It will be found that the apparatus described in FIGS. 15–17 can be used to produce a seismic pulse every six seconds on a 24-hour basis with a minimum amount of downtime for replacement of the elastomer.

Generally speaking, less than one cubic foot volume of gas at 13 p.s.i. need be injected into the apparatus described above in order to achieve satisfactory results. A satisfactory seismic pulse can be produced when the volume of the sleeve expands from one cubic foot to about four cubic feet. Penetration of the earth by seismic waves to depths of 20,000 feet and more can be effected using the apparatus described above. The elastomer sleeve is very easy to replace and has been found to give satisfactory service for 5000 and more firing cycles. Sleeves used with the apparatus of FIG. 15 have given satisfactory service for more than 14,000 firing cycles and remain in operable condition.

Many experiments have been performed using seismic wave sources as described above to determine the dimensions that produce seismic waves having a frequency spectrum most acceptable to the earth. It has been found that when the elastomer is approximately 10 inches in initial diameter and four feet in length and the combustion chamber has an initial volume of approximately ¾ cubic foot, seismic waves are produced that are most acceptable to the earth and at the same time there results the most efficient conversion of chemical energy to useful seismic energy.

I claim:

1. In a seismic wave source for use in water, wherein explosive combustible fluid is detonated within an expansible enclosure, the improvement comprising:

at least two elongated, heat-conductive tubular members, each open at both ends and arranged to permit free passage of water therethrough when said tubular members are passed through the water;

a rigid housing connected to one end of said tubular members;

first means including expansible, flexible elastomer means, affixed to said tubular members in sealing relationship therewith and surrounding said tubular members for at least a substantial portion of their length to form a sealed enclosure with said housing and said tubular members, said housing including an opening for providing fluid communication between the interior of said housing and the interior of said enclosure;

means connected to said housing for introducing an explosive combustible fluid into said enclosure; and means for igniting said explosive combustible fluid.

2. The apparatus of claim 1 further including means connected to said housing for exhausting gas from within said elastomer means through said housing.

3. The apparatus of claim 2 wherein said means for exhausting gas from said housing comprises an exhaust line connected to the housing for passing gases from the interior of the housing to the water surface at said marine location, and check valve means in said exhaust line for permitting flow of gases only from said housing through said exhaust line.

4. The apparatus of claim 3 wherein said check valve comprises a valve seat in fluid communication with the interior of the housing and a high inertia, spring-biased closure member for seating on said valve seat.

5. The apparatus of claim 4 wherein said valve closure member weighs at least five pounds.

6. The apparatus of claim 1 wherein said first means includes a rigid chamber member affixed to the far end of each of said tubular members from said housing, said elastomer means being in sealing engagement with said chamber member.

7. The apparatus of claim 6 further including elongated, rigid support members for said elastomer means having a plurality of openings therein to permit flow of gas therethrough and extending between and affixed at the ends thereof to said housing and said chamber member, and extending between and affixed to two of said tubular members at the longitudinal edges of said support members.

8. The apparatus of claim 7 wherein said support members are arcuate.

9. The apparatus of claim 7 wherein said support members are flat and substantially rectangular.

10. The apparatus of claim 1 wherein said housing includes inner and outer spaced-apart flow path defining members connected at one end to said tubular members and defining a flow path therebetween for flow of water therethrough and into said tubular members.

11. The apparatus of claim 1 wherein said tubular members are substantially parallel, are at least six in number, and are arranged in a circle.

12. A seismic wave source adapted to be moved through a body of water which comprises:

a conduit and combustion chamber assembly including at least one conduit and further including at least one opening to provide fluid communication between the interior and the exterior of the assembly;

an elastic inflatable member covering at least a portion of the surface of said assembly and secured thereto to form an expansible enclosure with said assembly;

said conduit extending through said enclosure and being heat conductive and arranged to provide a flow path for water internally of said enclosure to cool said conduit and combustion chamber assembly during movement of said source through said body of water;

first means to supply an explosive, combustible fluid to said enclosure;

second means to ignite said explosive combustible fluid within said enclosure;

and third means to vent products of combustion from said enclosure.

13. The apparatus of claim 12 wherein said conduit and combustion chamber assembly comprises a plurality of elongated substantially parallel tubular members, and an end member means connected to one end of said tubular members, for passing water from said body of water into said tubular members and for passing said combustible fluid between said tubular members.

14. The apparatus of claim 12 wherein said third means for venting products of combustion from said inflatable member comprises an exhaust line connected to the conduit and combustion assembly for passing gases from the interior thereof to the water surface, and check valve means in said exhaust line for permitting flow of products of combustion only from said enclosure through said exhaust line.

15. The apparatus of claim 14 wherein said check valve comprises a valve seat in fluid connection with the interior of the housing and a high inertia, spring-biased closure member for seating on said valve seat.

16. The apparatus of claim 12 wherein the conduit component of said combustion chamber and conduit assembly includes a plurality of substantially parallel tubular members arranged substantially in a circle; inner and outer coaxial members connected to one end of said tubular members and defining therewith a flow path for flow of water between said coaxial members and into said tubular members.

17. Apparatus for producing seismic waves in a body of water during seismograph operations conducted from a vessel, comprising:

an expansible enclosure;

first means including a flexible conduit connected to said expansible enclosure for conducting explosively combustible gas to the expansible enclosure from the vessel;

second means including flexible gas conduit means connected to said expansible enclosure for conducting products of combustion from said expansible enclosure to the vessel for venting to the atmosphere;

electrical means connected to said expansible enclosure for detonating combustible gases in said enclosure;

said expansible enclosure including conduit means arranged internally thereof to enable water to flow through said conduit means upon said vessel moving through said body of water for cooling said expansible enclosure.

18. The apparatus of claim 17 wherein said second means includes check valve means in said flexible gas conduit means having a movable valve member spring-biased into seating engagement with a valve seat, said movable valve member having high inertia.

19. The apparatus of claim 18 wherein said movable valve member weighs at least five pounds.

20. The apparatus of claim 19 wherein said expansible enclosure comprises:

a plurality of substantially parallel spaced-apart tubular members arranged in a circle;

inner and outer spaced apart flow path defining members for passing water from said body of water through said tubular members;

the inner of said flow path defining members being connected to said first and second means and to said electrical means for passing combustible gases to within the zone defined by said tubular members; and means including elastomer means connected to said tubular members and to the outer of said flow path defining members.

21. In a seismic wave source for use in a body of water including an inflatable member and means for igniting an explosively combustible fluid within said inflatable member, the improvement comprising:

first means including conduit means supporting said inconducting the detonation products from the enclosure to the water surface.

38. The process as defined in claim 37 in which the enclosure is vented a preselected period of time following detonation.

39. A seismic source adapted to be moved through a body of water which comprises:
a plurality of thermally conductive, substantially parallel conduits laterally spaced from one another;
a first end housing member supporting and penetrated in a fluid-tight relationship by first ends of said conduits;
a second end housing member supporting and penetrated in a fluid-tight relationship by the opposite ends of said conduits;
an elastic, inflatable sleeve covering said conduits and sealed in a fluid-tight relationship at its ends to said end housing members;
first conduit means to supply an explosively combustible fluid through one of said end housing members into said sleeve;
means to ignite said explosively combustible fluid within said sleeve to expand said sleeve;
second conduit means to vent said sleeve through one of said end housing members to the surface of said body of water;
said plurality of conduits being arranged to enable water from said body of water to flow through the conduits.

40. A seismic source as defined in claim 39 wherein said first conduit means is of character to supply an explosively combustible mixture of an oxygen-containing gas and a combustible gas.

References Cited

UNITED STATES PATENTS

| | | | |
|---|---|---|---|
| 2,561,309 | 7/1951 | Gaby | 181—.5 |
| 3,176,787 | 4/1965 | Roever | 181—.5 |
| 3,194,207 | 7/1965 | Dunne | 181—.5 |
| 3,233,694 | 2/1966 | Roever | 181—.5 |
| 3,256,501 | 6/1966 | Smith, Jr. | 181—.5 |
| 3,397,755 | 8/1968 | Loper | 181—.5 |

BENJAMIN A. BORCHELT, Primary Examiner

GERALD H. GLANZMAN, Assistant Examiner

U.S. Cl. X.R.

340—12 flatable member, said conduit means defining a flow path for cooling fluid to cool the surfaces of said first means that contact said inflatable member, said first means further defining with said inflatable member a closed combustion chamber distinct from said flow path for cooling fluid; and second means connected to said first means for introducing an explosively combustible fluid into said closed combustion chamber.

22. A seismic wave source adapted for use in water including:
an inflatable member;
first conduit means in contact with said inflatable member for supporting the same, said first conduit means defining a flow path for the flow of cooling water therethrough to cool said inflatable member, said inflatable member and said first conduit means defining a combustion chamber distinct from said flow path;
means for introducing an explosively combustible fluid into said combustion chamber;
and means for igniting said explosively combustible fluid in said combustion chamber to inflate said inflatable elastomer member.

23. The apparatus of claim 22 further including second conduit means connected to said combustion chamber for conducting products of combustion from the combustion chamber to the atmosphere, and check valve means in said second conduit means for permitting flow of products of combustion into said second conduit means from said combustion chamber when an interval of time has elapsed after the pressure in said combustion chamber has reached a predetermined value.

24. The apparatus of claim 22 wherein said first conduit means comprises:
a plurality of elongated, parallel, spaced-apart tubular members arranged in a closed curvilinear path;
inner and outer spaced-apart bell-shaped members connected to one end of said tubular members and arranged so that water passing between said bell-shaped members discharges only into said tubular members, the inner of said bell-shaped members being closed at the end thereof opposite said tubular members;
and closure means connecting together said tubular members at the end thereof opposite said bell-shaped members to prevent ingress of water into the combustion chamber.

25. The apparatus of claim 24 wherein said closure member comprises a plate between said tubular members and a third bell-shaped member connected to said plate and extending outwardly from said tubular members and away from said inner and outer bell-shaped members.

26. The apparatus of claim 23 wherein said means for introducing an explosively combustible fluid into said combustion chamber includes third conduit means extending to the water surface, and said second and third conduit means are banded together for towing of said seismic wave source.

27. A seismic energy source for use while submerged in a liquid medium, which comprises:
a supporting structure;
an expansible elastic member supported by and disposed upon at least a portion of said supporting structure to define an expansible chamber therewith;
means for introducing explosive material into said chamber;
means for detonating said explosive material within said chamber and thereby expanding said chamber; and
means for discharging from said chamber the products of combustion resulting from said detonation;
said supporting structure having at least one flow path said flow path being arranged for the movement of a fluid through said chamber and separate from explosive material and products of combustion in said chamber to cool said supporting structure and products of combustion within said chamber.

28. The apparatus of claim 27 wherein said expansible elastic member is in the shape of a sleeve.

29. An apparatus as defined in claim 27 wherein said explosive material is a mixture of combustible fuel and oxygen.

30. Apparatus as defined in claim 27 wherein said supporting structure defines the minimum volume of the chamber by limiting the inward movement of said expansible elastic member.

31. The apparatus of claim 27 wherein said flow path for cooling fluid includes a plurality of parallel tubular members arranged side by side.

32. The apparatus of claim 31 wherein said supporting structure includes a pair of bell-shaped members connected to one end of said plurality of tubular members, one of said bell-shaped members being positioned within the other and spaced therefrom so thta liquid passing into the space between said bell-shaped members is directed into said tubular members, said supporting structure further including a closure member connected to the opposite end of said bell-shaped members from said one end, said elastic member being connected to the outer of said bell-shaped members and to said closure member.

33. Apparatus for generating seismic waves in a liquid medium which comprises:
an enclosure for a combustible fluid comprising a housing having an inlet for the combustible fluid, an outlet for combustion products, at least one passageway for fluid flow between the interior and exterior of the housing, and an expansible elastic member secured to the housing and covering each said passageway to said the exterior surface of the housing;
a firing member connected to the enclosure for detonating the combustible fluid to expand the elastic member;
at least one conduit penetrating and disposed within the enclosure for the flow of cooling fluid therethrough for cooling the enclosure and the combustion products during and after detonation of the combustible fluid.

34. The apparatus as defined by claim 33 further comprising:
a second conduit in fluid communication with the enclosure outlet for venting the combustion products from the interior of the enclosure to the surface of said liquid medium; and
a valve within the second conduit to permit the passage of combustion products from said enclosure through said second conduit after a given time interval has elapsed after detonation of the combustible fluid.

35. The apparatus as defined by claim 34 wherein the valve includes a spring-biased, high-inertia member to permit substantial expansion of the elastic member prior to the passage of the combustion products from the enclosure.

36. A process for creating seismic waves which comprises:
introducing an explosively combustible fluid into an elastically expandible enclosure submerged in a liquid medium;
detonating the combustible fluid to form combustion products and expand the enclosure and thereby generate a seismic wave; and flowing a coolant fluid internally of said enclosure while maintaining said coolant fluid separate from and in heat exchange relationship with such combustion products to remove from the enclosure heat resulting from the detonation of said combustible fluid.

37. The process as defined in claim 36 further comprising:
venting the combustion products from the enclosure a given time interval after detonation to permit substantial expansion of the enclosure; and